UNITED STATES PATENT OFFICE.

TOYOKITSU UEDA, OF KIOTO, JAPAN.

GLASS-MATTING PROCESS.

1,306,505. Specification of Letters Patent. Patented June 10, 1919.

No Drawing. Application filed December 5, 1918. Serial No. 265,458.

*To all whom it may concern:*

Be it known that TOYOKITSU UEDA, engineer, citizen of Japan, residing at No. 314 Imadegawa Kozincho, Teramachi, Kioto, Japan, has invented certain new and useful Improvements in Glass-Matting Processes; and he does hereby declare the following to be a full, clear, and exact description of the invention, such as will enable others skilled in the art to which it appertains to make and use the same.

This invention relates to the art of producing surface effects on vitreous material, and it relates more particularly to a process of matting glass in which the glass is treated superficially with a substance capable of reacting with said glass under proper temperature conditions with formation of a product or products soluble in ordinary mineral acids, said substance being applied to the glass in conjunction with another substance relatively inert and not greatly acted upon or affected at the temperatures and under the conditions at which the action of the first mentioned substance takes place, the glass being heated ordinarily to a temperature somewhat above its softening point until it has been acted upon to the desired extent, and, after slow cooling, being then treated with a suitable mineral acid for removal of acid-soluble matter, this treatment being followed by washing and drying.

According to the best mode of practising the invention, the mixture applied to the vitreous surface to be treated comprises three principal constituents, viz: the active agent relied upon to attack or flux the vitreous surface, a more highly refractory and relatively inert material which does not itself undergo change to a great extent during the heat treatment but whose function is chiefly of a mechanical nature as will be hereinafter explained, and a cementing or binding agent, by means of which a mixture of the foregoing materials can be made to firmly adhere at ordinary temperatures to the vitreous surface to be treated.

The active constituent proper of the matting mixture may advantageously consist of the powder of fusible glasses or their raw materials, *e. g.*, basic alkali-silicates, basic lead silicates, lead oxides, plumbates, lead borates, or any other material of similar nature capable of producing the desired effect. In general, a material suitable for purposes of the present method should possess a low melting or fusing point and it, as well as its reaction product with glass, should be easily decomposable by common acids, such as sulfuric acid, hydrochloric acid, nitric acid, etc. Materials of this general character may conveniently be generically termed herein "glass material," this term being employed to designate either a glass itself, or a raw material or constituent entering into the composition of a glass or capable of fluxing glass. For convenience, the materials suitable for use as active agents in the matting mixture may be called primary materials.

The relatively inert constituent of the matting mixture is also most desirable in powder form and may consist of pulverized highly refractory material such as burned porcelain body, burned stoneware body, burned faience body, fireclays, kaolin, refractory chamotte, quartz, carbonate of alkaline earth, or any other material, that will not fuse at a temperature even considerably above the softening temperature of the glass or other vitreous material whose surface is to be matted, and will not be greatly affected by contact with the aforesaid primary material on exposure to heat at or somewhat above said softening temperature. Materials coming under this head may conveniently be called "secondary materials." To a mixture of selected primary and secondary materials in powdered form is added a cementing or binding agent that will not counteract or interfere with the effect of the primary or secondary material in the course of heating but which will render the mixture firmly adherent to a vitreous surface at ordinary temperatures. Examples of binders suitable for this purpose are boiled starch, gum, glue, albumen, soap, varnish, oil, or the like.

In matting glass in accordance with the invention any desired designs, figures, or characters may be placed or painted on its surface with an adherent mixture of the character above described. The glass is then placed in a furnace and heated for a time at a temperature somewhat higher than the softening point of the glass sufficiently long to effect the desired attack or fluxing action on the glass. The glass is then cooled down as slowly as possible and when sufficiently cool it is then treated with any ordinary strong mineral acid of the character above specified, to remove acid-soluble matter, the only exception being hydrofluoric acid which is ordinarily unsuitable or unnecessary for this purpose. After the treatment with acid, the glass is well washed and dried.

During the heating process, the primary materials combine chemically with a thin surface layer of the softened glass, forming a new combination or substance which, on account of the presence of the secondary materials, can be easily decomposed and removed with an acid; and when this is done, the matting is accomplished. The secondary materials function principally to prevent the primary materials and the reaction products thereof with the glass from sticking so fast to the glass surface as to make their decomposition by the acid difficult. Matted surfaces varying considerably in characteristics and appearance can be produced in accordance with this invention by employing secondary materials of different characteristics and different degrees of fineness.

What I claim is:

1. The process of producing surface effects on vitreous material which comprises applying to the surface of such material a substance capable of reacting upon said material with the aid of heat to form an acid-decomposable product, said substance being applied in conjunction with another substance which is relatively inert and is not greatly affected under the conditions of operation, heating until the surface of said material has been acted upon to the desired extent, and removing acid-decomposable matter with the aid of an acid.

2. The process of producing surface effects on vitreous material which comprises applying to the surface of vitreous material a mixture of a substance decomposable by mineral acids and fusible at the softening temperature of said material with another substance infusible at, and not greatly affected by the first mentioned substance at, temperatures even somewhat above such softening temperature, said first mentioned substance being capable of reacting with said vitreous material at such softening temperature, subjecting the thus prepared material to heat until it begins to soften, cooling the material and then treating it with a mineral acid.

3. The process of matting glass which comprises applying to glass a substance capable of fluxing the same at temperatures somewhat above the softening point of said glass with production of an acid-decomposable product, said substance being applied in mixture with a more inert and refractory substance, subjecting the thus prepared glass to heat at a temperature sufficiently high to effect the desired fluxing action on the glass without greatly affecting said more refractory substance, and treating the glass, after cooling, with a mineral acid.

4. The process of matting glass which comprises applying to glass a mixture of a low-fusing substance comprising a glass material with mineral matter and a binder, said mineral matter being infusible even at temperatures considerably above the softening point of said glass and not greatly affected by said substance at temperatures somewhat above said softening point, heating the thus prepared glass to a temperature somewhat above its softening point, cooling it, and treating it with a mineral acid, other than hydrofluoric acid, to remove acid-decomposable matter, substantially as described.

5. The process of matting glass which comprises applying to glass a mixture of a low-fusing glass-fluxing substance in powder form with highly refractory material in powder form and a binder, heating the thus prepared glass to a temperature at which said substance exercises its fluxing action but at which said refractory material is not greatly affected, cooling the glass, and treating it with acid to remove acid-decomposable matter, substantially as described.

6. The process of matting glass which comprises applying to glass an adherent mixture of a low-fusing powdered glass material with powdered material which is more refractory and relatively inert at temperatures even somewhat above the softening point of said glass, heating the thus prepared glass somewhat above its softening point, cooling, treating it with an acid, other than hydrofluoric acid, to remove acid-decomposable matter, washing, and drying.

In testimony whereof I hereunto affix my signature.

TOYOKITSU UEDA.